US010930274B2

(12) United States Patent
Donati et al.

(10) Patent No.: US 10,930,274 B2
(45) Date of Patent: Feb. 23, 2021

(54) PERSONALIZED PRONUNCIATION HINTS BASED ON USER SPEECH

(71) Applicant: International Business Machines Corporation, Armonk, NY (US)

(72) Inventors: Michael Donati, Billerica, MA (US); Nadiya Kochura, Bolton, MA (US); Scott L. Sachs, Washington, NC (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 16/205,404

(22) Filed: Nov. 30, 2018

(65) Prior Publication Data

US 2020/0175968 A1 Jun. 4, 2020

(51) Int. Cl.

| | |
|---|---|
| ***G10L 15/00*** | (2013.01) |
| ***G06F 40/30*** | (2020.01) |
| ***G10L 15/187*** | (2013.01) |
| ***G10L 15/02*** | (2006.01) |
| ***G10L 15/18*** | (2013.01) |
| ***G10L 15/22*** | (2006.01) |
| ***G10L 15/30*** | (2013.01) |

(52) U.S. Cl.

CPC .......... *G10L 15/187* (2013.01); *G10L 15/005* (2013.01); *G10L 15/02* (2013.01); *G10L 15/1815* (2013.01); *G10L 15/22* (2013.01); *G10L 15/30* (2013.01); *G10L 2015/025* (2013.01)

(58) Field of Classification Search

CPC ..... G10L 15/005; G10L 15/063; G06F 40/30; G06F 40/205

See application file for complete search history.

(56) References Cited

U.S. PATENT DOCUMENTS

| | | | | |
|---|---|---|---|---|
| 7,401,018 | B2 * | 7/2008 | Yamada | G09B 5/065 434/185 |
| 8,204,748 | B2 | 6/2012 | Proux et al. | |
| 8,655,659 | B2 | 2/2014 | Wang et al. | |
| 8,943,404 | B1 | 1/2015 | Mager | |
| 9,747,891 | B1 | 8/2017 | Abuelsaad et al. | |

(Continued)

OTHER PUBLICATIONS

"Custom Speech Service Documentation", May 7, 2018, 43 pages.

(Continued)

*Primary Examiner* — Shreyans A Patel

(74) *Attorney, Agent, or Firm* — Randy E. Tejeda

(57) ABSTRACT

In an approach to analyzing a sound file, determining the language of the sound file and the display, creating a pronunciation map between the languages, generating a set of pronunciation hints based on the pronunciation map, and displaying the set of pronunciation hints, one or more computer processors identify a word from one or more words in a sound file. The one or more computer processors determine a dialect of spoken language for the word. The one or more computer processors determine a different language to display the word. The one or more computer processors retrieve one or more phonological rules based on the determined spoken language of the word and the determined different language to display the word. The one or more computer processors create a pronunciation map based on the retrieved phonological rules of the word.

20 Claims, 4 Drawing Sheets

(56) References Cited

U.S. PATENT DOCUMENTS

| | | | | |
|---|---|---|---|---|
| 9,852,728 | B2 | 12/2017 | Singh et al. | |
| 9,966,060 | B2 | 5/2018 | Naik et al. | |
| 9,990,916 | B2 | 6/2018 | Vanreusel et al. | |
| 10,013,971 | B1 | 7/2018 | Lewis et al. | |
| 2010/0299133 | A1* | 11/2010 | Kopparapu | G06F 40/40 704/2 |
| 2011/0207093 | A1* | 8/2011 | Keyes | G09B 21/025 434/114 |
| 2013/0130212 | A1* | 5/2013 | Dohring | G09B 19/06 434/157 |
| 2015/0112674 | A1* | 4/2015 | Zhang | G10L 15/063 704/235 |
| 2017/0178621 | A1* | 6/2017 | Raemy | G06F 40/205 |
| 2017/0221475 | A1 | 8/2017 | Bruguier et al. | |
| 2017/0287474 | A1* | 10/2017 | Maergner | G10L 15/063 |
| 2017/0309272 | A1* | 10/2017 | Vanreusel | G06F 40/30 |
| 2018/0068662 | A1 | 3/2018 | Schlippe et al. | |
| 2018/0108344 | A1 | 4/2018 | Lacoss-Arnold | |
| 2018/0197528 | A1 | 7/2018 | Pike et al. | |
| 2020/0135177 | A1* | 4/2020 | Li | G10L 15/005 |
| 2020/0175968 | A1* | 6/2020 | Donati | G10L 15/02 |

OTHER PUBLICATIONS

"Customize the TTS dictionary", printed on Aug. 30, 2018, 6 pages, <https://help.xmatters.com/OnDemand/installadmin/systemadministration/tts_dictionary.htm>.

Bruguier et al., "Learning Personalized Pronunciations for Contact Name Recognition", Google Inc., USA, printed on Aug. 30, 2018, 5 pages.

Chan et al., "Discriminative Pronunciation Learning for Speech Recognition for Resource Scarce Languages", Carnegie Mellon University, 5000 Forbes Avenue, Pittsburgh, U.S.A., printed on Aug. 30, 2018, 6 pages.

Cipriani, Jason, "How to tell your Facebook friends how to pronounce your name", Aug. 6, 2015, C|net, 5 pages, <https://www.cnet.com/how-to/how-to-tell-your-facebook-friends-how-to-pronounce-your-name/>.

Lee et al., "Smartphone-Assisted Pronunciation Learning Technique for Ambient Intelligence", IEEE Access, Special Section on Trends and Advances for Ambient Intelligence With Internet of Things (IoT) Systems, Received Nov. 23, 2016, accepted Dec. 13, 2016, date of publication Dec. 19, 2016, date of current version Feb. 25, 2017, vol. 5, 2017, 14 pages.

* cited by examiner

PERSONALIZED PRONUNCIATION HINTS BASED ON USER SPEECH

BACKGROUND

The present invention relates generally to the field of language processing, and more particularly to creating sets of pronunciation maps based on the language of a sound file and a display and generating pronunciation hints.

A phoneme is one of the units of sound (or gesture in the case of sign languages) that distinguish one word from another in a particular language. For example, in most dialects of English, the sound patterns "/θΛm/" (thumb) and "/dΛm/" (dumb) are two separate words distinguished by the substitution of one phoneme, "/θ/", for another phoneme, "/d/". Two words that differ in meaning through a contrast of a single phoneme form what is called a minimal pair. In many other languages these would be interpreted as exactly the same set of phonemes (i.e. "/θ/" and "d/" would be considered the same). In linguistics, phonemes (usually established by the use of minimal pairs, such as pat vs bat) are written between slashes, e.g. "/p/". To show pronunciation more precisely linguists use square brackets, for example "[p$^{h}$]" (indicating an aspirated p).

Phonemes are generally regarded as an abstraction of a set (or equivalence class) of speech sounds (phones) which are perceived as equivalent to each other in a given language. For example, in English, the k sounds in the words kit and skill are not identical (as described below), but they are distributional variants of a single phoneme "/k/". Different speech sounds that are realizations of the same phoneme are known as allophones. Allophonic variation may be conditioned, in which case a certain phoneme is realized as a certain allophone in particular phonological environments, or it may be free in which case it may vary randomly. In this way, phonemes are often considered to constitute an abstract underlying representation for segments of words, while speech sounds make up the corresponding phonetic realization, or surface form.

The International Phonetic Alphabet (IPA) is an alphabetic system of phonetic notation based primarily on the Latin alphabet. It was devised by the International Phonetic Association in the late 19th century as a standardized representation of the sounds of spoken language. The IPA is used by lexicographers, foreign language students, and teachers, linguists, speech-language pathologists, singers, actors, constructed language creators, and translators. The IPA is designed to represent only those qualities of speech that are part of oral language: phones, phonemes, intonation and the separation of words, and syllables. To represent additional qualities of speech, such as tooth gnashing, lisping, and sounds made with a cleft lip and cleft palate, an extended set of symbols, the extensions to the International Phonetic Alphabet, may be used. IPA symbols are composed of one or more elements of two basic types, letters, and diacritics. For example, the sound of the English letter "<t>" may be transcribed in IPA with a single letter, "[t]", or with a letter plus diacritics, "[t̪$^{h}$]", depending on how precise one wishes to be. Often, slashes are used to signal broad or phonemic transcription; thus, "/t/" is less specific than, and could refer to, either "[t̪$^{h}$]" or "[t]", depending on the context and language.

N-gram models are widely used in statistical natural language processing. In speech recognition, phonemes and sequences of phonemes are modeled using a n-gram distribution. For parsing, words are modeled such that each n-gram is composed of n words. For language identification, sequences of characters/graphemes (e.g., letters of the alphabet) are modeled for different languages. For sequences of characters, the 3-grams (sometimes referred to as "trigrams") that can be generated from "good morning" are "goo", "ood", "od", "d m", "mo", "mor" and so forth, counting the space character as a gram (sometimes the beginning and end of a text are modeled explicitly, adding "_g", "_go", "ng_", and "g_"). For sequences of words, the trigrams (shingles) that can be generated from "the dog smelled like a skunk" are "#the dog", "the dog smelled", "dog smelled like", "smelled like a", "like a skunk" and "a skunk #".

Idiolect is an individual's distinctive and unique use of language, including speech. This unique usage encompasses vocabulary, grammar, and pronunciation. Idiolect is the variety of language unique to an individual. This differs from a dialect, a common set of linguistic characteristics shared among some group of people. The term idiolect refers to the language of an individual. An isogloss is the geographic boundary of a certain linguistic feature, such as the pronunciation of a vowel, the meaning of a word, or the use of some morphological or syntactic feature. Major dialects are typically demarcated by bundles of isoglosses, such as the Benrath line that distinguishes High German from the other West Germanic languages and the La Spezia-Rimini Line that divides the Northern Italian dialects from Central Italian dialects. However, an individual isogloss may or may not have any coincidence with a language border. For example, the front-rounding of "/y/" cuts across France and Germany, while the "/y/" is absent from Italian and Spanish words that are cognates with the "/y/"-containing French words.

SUMMARY

Embodiments of the present invention disclose a method, a computer program product, and a system for analyzing a sound file, determining the language of the sound file and the display, creating a pronunciation map between the languages, generating a set of pronunciation hints based on the pronunciation map, and displaying the set of pronunciation hints. The method includes one or more computer processors identifying a word from one or more words in a sound file. The one or more computer processors determine a dialect of spoken language for the word. The one or more computer processors determine a different language to display the word. The one or more computer processors retrieve one or more phonological rules based on the determined spoken language of the word and the determined different language to display the word. The one or more computer processors create a pronunciation map based on the retrieved phonological rules of the word.

DETAILED DESCRIPTION

Current speech to text and text to speech systems commonly mispronounce words especially when the systems attempt to correctly pronounce names of individuals. These systems traditionally utilize prebuilt dictionaries to determine pronunciation in a particular dialect. Furthermore, these systems only suggest a limited number of ways of pronouncing a term irrespective of the phonic rules of the native language of the term. Traditionally, these systems translate auditory speech into a textual dictionary word and then utilize the dictionary word to generate pronunciation aids, ignoring the phonetics of the original speech language.

Embodiments of the present invention recognize that reliability and efficiency may be gained by creating a pronunciation mapping between the language of the speech and the language of the user, thereby circumventing the need of any user interaction to fix mistaken pronunciations and allowing the user to receive pronunciation hints that incorporate the phonetics of the pre-translated speech/word. This allows a user to pronounce a word in the dialect of another language while utilizing characters from the language of the user. Embodiments of the present invention further recognize that efficiency may be gained by the use of graphics or images to aid in pronunciation in addition to standard phonetic symbols. Implementation of embodiments of the invention may take a variety of forms, and exemplary implementation details are discussed subsequently with reference to the Figures.

Figure 1:
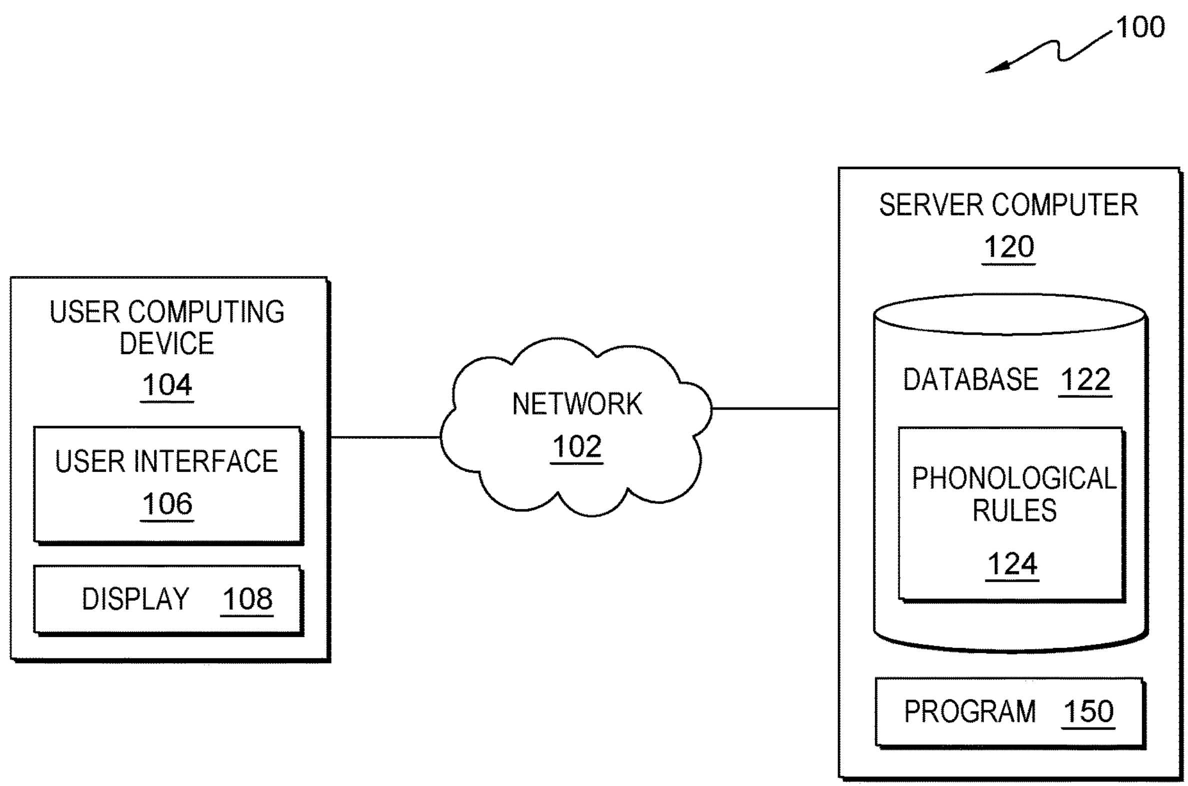
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes user computing device 104 and server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between user computing device 104, server computer 120, and other computing devices (not shown) within distributed data processing environment 100.

User computing device 104 may be a web server or any other electronic device or computing system capable of processing program instructions and receiving and sending data. In some embodiments, user computing device 104 may be a laptop computer, a tablet computer, a netbook computer, a personal computer (PC), a desktop computer, a personal digital assistant (PDA), a smart phone, or any programmable electronic device capable of communicating with network 102. In other embodiments, user computing device 104 may represent a server computing system utilizing multiple computers as a server system, such as in a cloud computing environment. In general, user computing device 104 is representative of any electronic device or combination of electronic devices capable of executing machine readable program instructions as described in greater detail with regard to FIG. 4, in accordance with embodiments of the present invention. In the depicted embodiment, user computing device 104 includes user interface 106 and display 108.

User interface 106 is a program that provides an interface between a user of user computing device 104 and a plurality of applications that reside on user computing devices 104 (e.g., telecommunication application (not depicted)) and/or may be accessed over network 102. A user interface, such as user interface 106, refers to the information (e.g., graphic, text, sound) that a program presents to a user and the control sequences the user employs to control the program. A variety of types of user interfaces exist. In one embodiment, user interface 106 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. In some examples, user interface 106 send and receive information through network 102 to program 150.

Display 108 provides an output device for the presentation of information processed by program 150, which may be accessed over network 102. A user display, such as display 108, refers to the medium device that program 150 presents information on (e.g., graphic, text, sound, haptic). A variety of types of user displays exist. In one embodiment, display 108 is a heads-up display. In another embodiment, display 108 is combined with user computing device 104. For example, program 150 presents the generated pronunciation hints on the display of user computing device 104 instead of an external display. In an alternative embodiment, display 108 is a standalone device that is accessible through network 102. For example, display 108 may be an external monitor capable of receiving streaming data. In various embodiments, display 108 is an haptic device capable of tactile responses (e.g., electronic braille, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with user computing device 104 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes database 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside on user computing device 104 or elsewhere within distributed data processing environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical pronunciation mappings, historical user recognition training, and metadata associated with historical users (e.g., languages spoken, user identification, etc.)

Phonological rules 124 is a corpus of phonetic processes for a variety of known languages. In an embodiment, phonological rules 124 contains sets of phonetic rules for each distinct language. In this embodiment, each set may contain series of phonological rules which include, but are not limited to, assimilation (a sound changes one of its features to be more similar to an adjacent sound), dissimilation (a sound changes one of its features to become less similar to an adjacent sound), insertion (an extra sound is added between two others), deletion (a sound, such as a stress-less syllable or a weak consonant, is not pronounced), and metathesis (two sounds switch places). In various embodiments, phonological rules 124 includes historical pronunciation mappings along with associated metadata such as the languages used, contextual metadata, historical phoneme to phoneme pairs, associated homonyms, and associated images, etc. In another embodiment, the historical pronunciation maps are clustered into metrical trees where sentences and words are split into prosodic constituents (e.g., moras, syllables, feet, phonological words, clitic groups, phonological phrases, intermediate phrases, intonational phrases, phonological utterances, etc.). In yet another embodiment, phonological rules 124 contains linguistic maps which segment languages into hierarchical groups based on a feature-by-feature comparison of the languages. Typically, languages that derive from a shared ancestor language share common properties and are grouped together. In various embodiments, phonological rules 124 contains excerpts of user speech and associated user pronunciation mappings. In this embodiment, the pronunciation mappings are derived from the speech mannerisms of the user.

Program 150 is a program for analyzing a sound file, determining the language of the sound file and the display, creating a pronunciation map between the languages, generating a set of pronunciation hints based on the pronunciation map, and displaying the set of pronunciation hints. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In some embodiments, program 150 may implement the following steps. Program 150 detects a sound file containing a word, phrase, or sentence. Program 150 analyzes the sound file, generating lexical and structural metadata. In an embodiment, program 150 may convert the sound file to a textual format. In another embodiment, program 150 converts the sound file into the textual phonemes. Program 150 utilizes natural language processing (NLP) techniques to determine the language of the speech contained in the sound file and the language of the display (e.g., display 108). Program 150 retrieves the phonetic rules of the determined languages. Program 150 creates a pronunciation mapping based on the retrieved phonetic rules and the generated sound file metadata. Program 150 generates textual and imaged based pronunciation hints based on the created pronunciation mapping. Program 150 displays the pronunciation hints on the user display. Program 150 is depicted and described in further detail with respect to FIG. 2.

Figure 2:
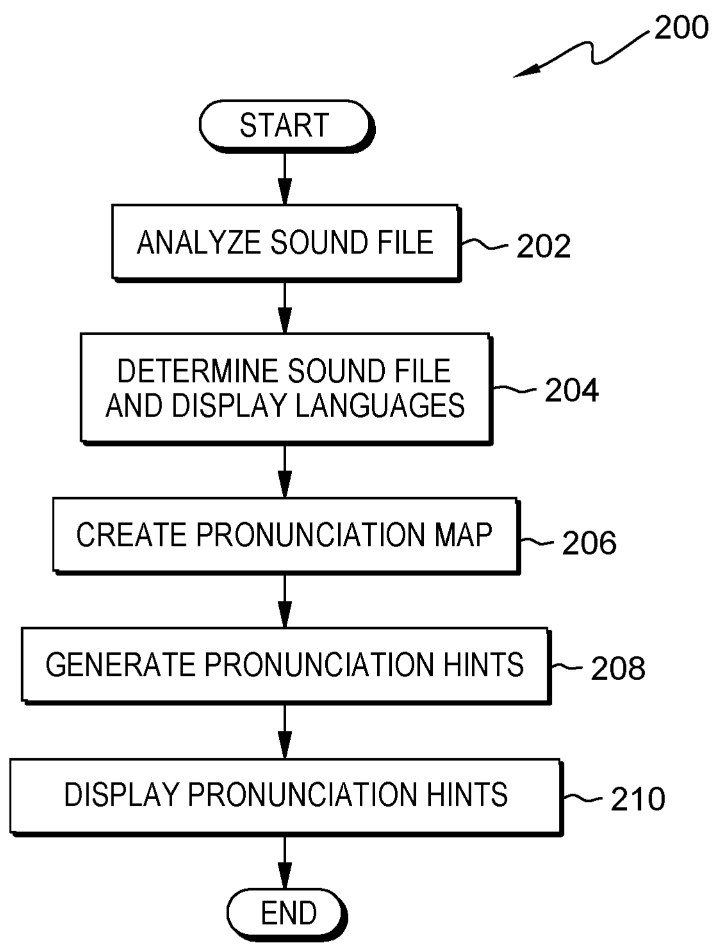
FIG. 2 is a flowchart depicting operational steps of a pronunciation mapping program, on a server computer within the distributed data processing environment of FIG. 1, for analyzing a sound file, determining the language of the sound file and the display, creating a pronunciation map between the languages, generating a set of pronunciation hints based on the pronunciation map, and displaying the set of pronunciation hints, in accordance with an embodiment of the present invention.

FIG. 2 is a flowchart depicting operational steps of program 150 for analyzing a sound file, determining the language of the sound file and the display, creating a pronunciation map between the languages, generating a set of pronunciation hints based on the pronunciation map, and displaying the set of pronunciation hints, in accordance with an embodiment of the present invention.

Program 150 analyzes the sound file (step 202). In an embodiment, the user initiates program 150 by inputting a sound file. For example, the user inputs a previously recorded sound file contains the name "Fang" into program 150. In another embodiment, the user sends a notification to program 150 to initiate. In yet another embodiment, program 150 utilizes a microphone (not depicted) to detect auditory speech. In a further embodiment, program 150 creates a sound file based on detected auditory speech. In an alternative embodiment, program 150 creates a sound file when the language of the speech is determined to be distinct from the primary language of the user. For example, program 150 creates a sound file of a coworker speaking Spanish when the primary language of the user is English.

In one embodiment, the user utilizes program 150 to record the sound file utilizing a microphone (not depicted). For example, the user speaks the Chinese name "Fang" into the microphone, then program 150 detects and records the name into a sound file. In another embodiment, program 150 retrieves the sound file from a recording application (not depicted) or from a sound file repository (not depicted). In various embodiments, the user records a single word or name into the sound file. In alternative embodiments, the user records a sentence or phrase into the sound file. For example, the user records and inputs a sound file with the following phrase "Fang wants to go to the store". In this embodiment, program 150 program 150 segments the phrase into its individual words and linguistic components.

Responsive to program 150 detecting and retrieving the sound file, program 150 may analyze the sound file utilizing NLP techniques, specifically utilizing speech to text techniques such as speech recognition and speech segmentation. In an embodiment, program 150 utilizes speech recognition to generate a textual representation of the speech contained in the user sound file. In a further embodiment, program 150 utilizes speech segmentation to separate the user speech into individual words. In this embodiment, speech segmentation utilizes natural pauses between successive words to separate and delineate the individual words. In an alternative embodiment, program 150 utilizes Role and Reference Grammar (RRG) techniques to parse languages that do not contain spaces between words such as Chinese or Japanese.

In yet another embodiment, program 150 utilizes machine learning algorithms such as Hidden Markov models, neural networks (e.g., deep feedforward neural networks (DNN), recurrent neural networks, etc.), and end-to-end automatic speech recognition (ASR) to further analyze and parse the user speech. The aforementioned techniques allow program 150 to determine the context, grammar, and semantics of the user speech contained in the sound file. In a further embodiment, the user may train program 150 by speaking or inputting text or isolated vocabulary. In this embodiment, program 150 analyzes the voice of the user and adjusts speech recognition properties and weights resulting in increased recognition accuracy. In a further embodiment, program 150 stores or logs the identity of the user and associated speech metadata in order to allow retrieval of such data in subsequent uses. In various embodiments, program 150 identifies the sound file speaker and retrieves and applies associated training results. In an example situation, where the user has a strong accent, program 150 identifies and adjusts for the speech particularities of the user.

In an embodiment, program 150 decomposes the speech contained in the sound file into individual phonemes allowing program 150 to distinguish words and languages. For example, program 150 decomposes the word thumb into the phoneme "/θΛm/". In another embodiment, program 150 decomposes a word, phrase, or sentence into smaller lexical segments. For example, program 150 decomposes the term "dogs" into several lexical segments such as "d", "do", "dog" and finally "dogs". In another embodiment, program 150 associates a grammatical rule to each segment, allowing program 150 to parse complex word, phrase, or sentence structures. In yet another embodiment, program 150 creates feature vectors for every identified phoneme that include nasal, consonantal, sonorant, tone information.

Program 150 determines a language (step 204). Program 150 may determine the language of the sound file. In an embodiment, the sound file consists of one language. In this embodiment, program 150 determines the language of the sound file as whole, all words consist of the same language. In an alternative embodiment, program 150 determines the language for each identified word in the sound file. For example, an English/Spanish speaker creates a sound file that contains phrases that intermix Spanish and English words. In this example, program 150 determines the language of each word rather than the language of the sound file as a whole. In one embodiment, the user inputs the sound file language and/or display language into program 150 via a user interface such as user interface 106. For example, if the language spoken in the sound file is Finnish, the user would designate the sound file language as Finnish. In another embodiment, program 150 utilizes the analyzed sound file components to determine the language of the sound file. In this embodiment, the analyzed sound file may be in a textual form.

Program 150 may determine the language of the display. In an embodiment, program 150 retrieves the display language from the settings or metadata located within a user interface (e.g., user interface 106). In a further embodiment, program 150 retrieves the display language from the host operating system. For example, if the host operating system is operating in English then program 150 retrieves the language from the operating system and determines that the display language is English.

In an embodiment, if program 150 is unable to retrieve the language of the sound file and/or display, then program 150 utilizes text language identification techniques (e.g., n-gram, character encoding detection, text compressibility, Naïve Bayes, etc.) to determine the languages. In various embodiments, program 150 may utilize direct character comparison, where program 150 compares the characters used on the display to a set of known languages to determine the language of the display. In an alternative embodiment, program 150 compares the text compressibility of the display to the text compressibility of texts in known languages to determine the language of the display. In an example situation, program 150 determines that the display could be multiple languages, an issue for lexical and structural similar languages. In this example, program 150 prompts the user for verification or additional input.

Program 150 creates the pronunciation map (step 206). Program 150 utilizes the determined sound file and display languages (step 204) to retrieve associated phonological rules from a repository such as phonological rules 124. The associated phonological rules may comprise of language specific phonetic rules in addition to the following prosodic rules: syllable, onset and rime, articulatory gestures, articulatory features, mora, etc. In an alternative embodiment, program 150 retrieves equivalent phonological rules for sign languages that include, but are not limited to, movement, location, and handshape rules.

In various embodiments, program 150 analyzes the determined sound file and display languages for lexical similarity; how similar are the word sets for two languages. In an embodiment, program 150 calculates a linguistic distance which is a measurement of the ability of speakers of one language to understand the other language. For example, the French and Spanish languages have a low linguistic distance demonstrating the numerous similarities of the two languages. In another embodiment, program 150 retrieves linguistic maps from phonological rules 124 to calculate the similarity of the languages. For example, if two languages share a common language ancestor, it can be assumed that the languages share common properties and phonetic rules. In yet another embodiment, program 150 utilizes lexicostatistics to compare two languages. In this embodiment, program 150 compares the percentage of lexical cognates (words that have a common origin) between the languages to determine the relationship of the languages and similarities. For example, if two languages share a high percentage of lexical cognates, then program 150 calculates a low distance score between the languages, signifying a high level of language similarity.

Responsive to calculating the similarity of the determined languages, program 150 creates a pronunciation mapping between the language of the terms in the sound file and the display language. In various embodiments, program 150 utilizes an alphabet/character map, especially useful with similar languages, between the determined sound file language and the determined display language. For example, if the sound file language is in Chinese and the display language is English, then program 150 retrieves the alphabets of both languages and converts the Chinese characters into English equivalents. In an example situation, program 150 analyzes the sound file and determines that the sound file includes the Chinese name "Zhong". In this situation, program 150 utilizes alphabet mapping to convert "Zhong"

into the English equivalent "Gong", where the Chinese "Zh" is mapped to the English "G".

In numerous embodiments, program 150 applies the retrieved phonetic rules to the textual terms analyzed and determined within the sound file. In this embodiment, program 150 converts and segments said terms into phonemes within its respective language. For example, the Russian name "Иван" (Ivan) is translated into the display language and segmented into the phoneme "[ee-van]". In yet another embodiment, program 150 segments and converts said terms into the International Phonetic Alphabet (IPA). Continuing from the previous example, the Russian name "Иван" (Ivan) is converted into the IPA phoneme "[ɪ.'van]". In a further embodiment, the IPA phoneme is converted into a phoneme in the display language. For example, the IPA phoneme "[ɪ.'van]" is converted to an English phoneme such as "[eye-van]". In yet another embodiment, program 150 utilizes the rules retrieved from phonological rules 124 to convert the phoneme created from the terms in the sound file into a phoneme based on the display language. In various embodiments, program 150 creates phonemes based on the speech on the sound file rather than the textual and dictionary conversion of the speech. In further embodiment, program 150 identifies idiolectic features of the created phonemes. In this embodiment, extracts phonological features (i.e., phonetics, syntax, semantics, morphology, etc.) that are unique to the speaker. In yet another embodiment, program 150 identifies isoglos sic features of the phonemes words. In this embodiment, program 150 extracts phonological features that are unique to a geographic area. In a further embodiment, program 150 retrieves rules from phonological rules 124 that correspond with the geographic area identified by the extracted isoglos sic features.

For example, a Spanish speaker pronounces the name "Jose" as "[tʃoʊ 'zeɪ]" or "[joe-say]" instead of the traditional pronunciation "[hoʊ 'zeɪ]" or "[ho-zay]". In this example, program 150 converts the phoneme of the speaker into either the IPA or display language phoneme equivalent based on the particular speech dialect, accent, and vocal patterns of the speaker.

Program 150 generates pronunciation hints (step 208). In an embodiment, program 150 generates textual pronunciation hints based on the determined phonemes from step 206. For example, if program 150 generates the phoneme "[ɪ.'van]" for the name Ivan, then program 150 generates a pronunciation hint which includes the phoneme. In an embodiment, program 150 segments the phoneme into its respective syllables. In another embodiment, program 150 incorporates phonological rules 124 to incorporate information regarding tone, stress, context, etc. In another embodiment, program 150 generates pronunciation hints utilizing the converted IPA phonemes. In an alternative embodiment, program 150 generates the pronunciation hints utilizing the display language phonemes.

In an embodiment, program 150 identifies additional terms that may rhyme with determined phonemes. In a further embodiment, program 150 identifies the sounds represented by the phoneme and identifies similar terms that have a similar phonetic structure. In this embodiment, the rhyming term may rhyme with an individual syllable in the phoneme or the rhyming term may rhyme with phoneme as a whole. For example, if program 150 decomposes the name "Jose" into the English phoneme "[ho-zay]", then program 150 identifies that the term "so" is phonetically similar with the syllable "ho" and the term "say" is phonetically similar with the syllable "zay". In this example, program 150 identifies and generates the rhyming terms to assist the user in pronouncing the produced phoneme.

Figure 3:
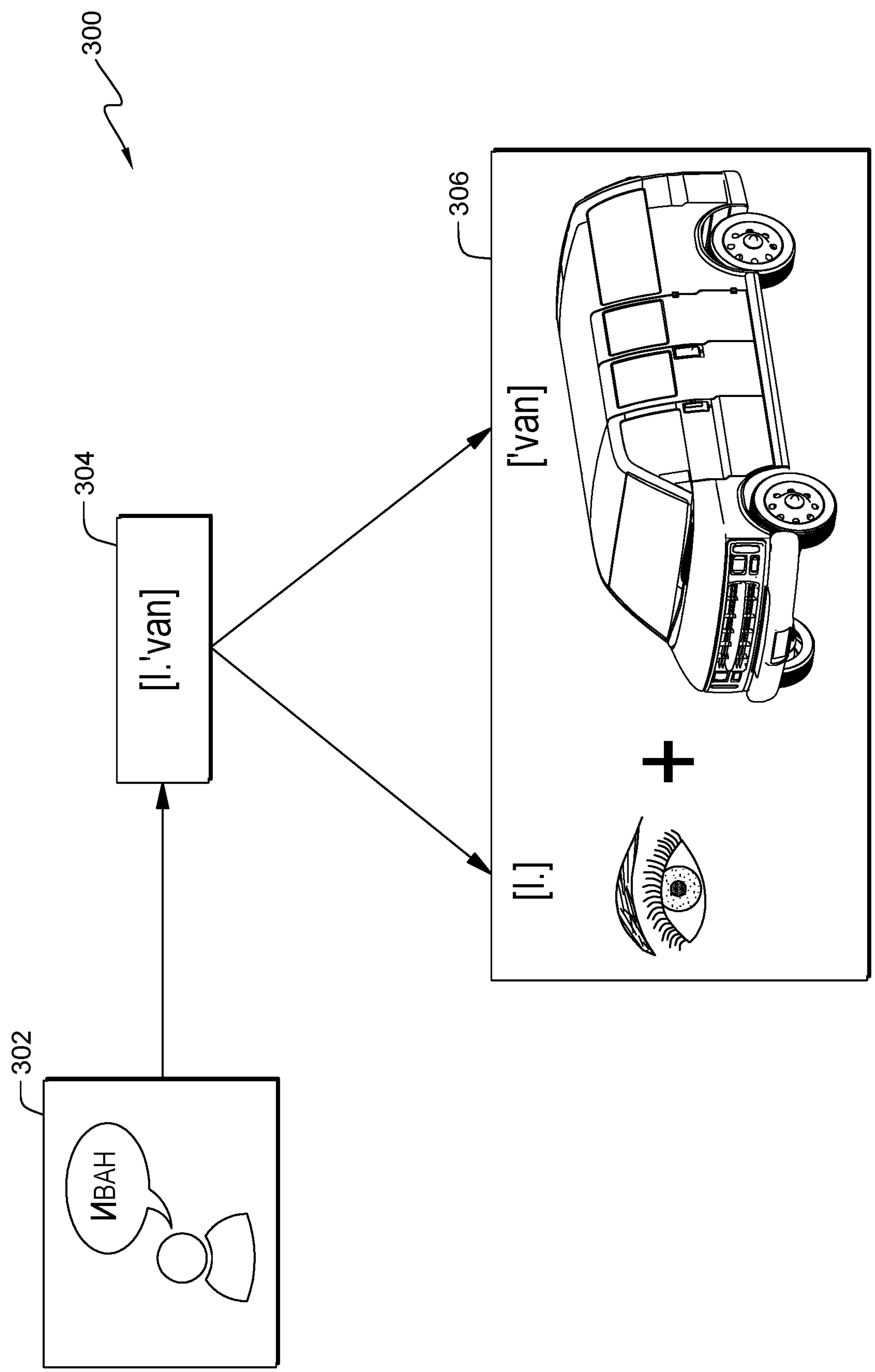
FIG. 3 depicts an example of a spoken word converted into a phoneme with its associated images, in accordance with an embodiment of the present invention.

In various embodiments, program 150 identifies terms and corresponding images that are heteronyms of the identified terms within the sound file. In an embodiment, program 150 identifies the sounds used within the sound file phonemes and identifies terms that share the exact or highly similar phonetic structure. Responsive to identifying said terms, program 150 may retrieve images that represent the terms. For example, if program 150 decomposes the term "Ivan" into the phoneme "[ɪ.'van]", then program 150 identifies terms that are associated with this phoneme. In this example, program 150 segments the phoneme into its respective syllables, "[ɪ.]" and "['van]", identifies that the terms "eye" and "van" share the same phonetic structure as the segmented phoneme, and then retrieves images associated with the terms "eye" and "van", as depicted in FIG. 3.

In other embodiments, program 150 adjusts the generated phonemes and pronunciation hints based on the speech of the user rather than traditional pronunciation maps. In this embodiment, program 150 utilizes the mannerisms, particularities and/or deficiencies of the speech of the user to create user specific pronunciation maps. These pronunciations maps map the manner the user speaks with how the sound would be traditionally spoken. For example, if the user has a speech impediment which prevents the user from speaking "[ɹ]" (r) sounds, then program 150 adjusts the generated pronunciation hints to either replace "[ɹ]" sounds with a similar phoneme or destress the "[ɹ]" sound.

Program 150 displays pronunciation hints (step 210). In some embodiments, in response to creating a pronunciation map and generating pronunciation hints, program 150 displays the generated pronunciation hints, via display 108. In various embodiments, program 150 determines the capabilities of the display (e.g., display 108). Responsive to the capabilities of the display, program 150 may adjust the amount of information presented to the user. For example, if program 150 determines that the display has a low resolution, incapable of displaying images clearly, then program 150 may present the pronunciation hint in a textual form such as presenting the phoneme and/or any associated rhyming words without any additional images.

In one embodiment, program 150 displays the pronunciation hints on user computing device (e.g., user computing device 104). In various embodiments, program 150 may determine that the user computing device (e.g., user computing device 104) does not have a display surface and therefore, program 150 may send auditory based pronunciation hints to the user computing device. In an example situation where the user is blind, program 150 converts the textual pronunciation hints to auditory pronunciation hints. In this example situation, program 150 utilizes text to speech techniques to provide auditory pronunciation hints. In other embodiments, program 150 may provide haptic feedback instead of displaying the hints on a visual display. In a further embodiment, program 150 provides haptic feedback through an electronic braille system. In this embodiment, program 150 maps the phonemes to the braille equivalents. In this embodiment, program 150 provides pronunciation hints through haptic feedback in addition to the visual pronunciation hints. In some embodiments, program 150 may not control a device capable of interfacing with a user, but rather program 150 may send instructions to the device, which in turn displays or otherwise interacts with a user based on the received instructions.

FIG. 3 depicts sample pronunciation map 300, which is an example illustration of program 150 generating a pronunciation hint with its associated images as demonstrated in step 206 and 208. Sample pronunciation map 300 includes spoken word 302, phoneme 304, and pronunciation hint 306. Pronunciation hint 306 includes the segmented phoneme along with its associated images.

In a detailed example of flowchart 200, an English user inputs a sound file containing the name "Иван" ("Ivan") spoken by a Russian speaker into program 150. Upon detection of the sound file, program 150 analyzes the speech contained in the sound file and extracts phonological metadata, as discussed in step 202. After analyzing the sound file, program 150 determines the languages of the display and of the speech contained in the sound file as depicted in spoken word 302, as discussed in step 204. Based on the determined languages, program 150 creates a pronunciation map between the languages, as discussed in step 206 and depicted in phoneme 304. Responsive to program 150 creating the pronunciation map, program 150 generates pronunciation hints and retrieves associated images, as discussed in step 208 and depicted in pronunciation hint 306. Program 150 then displays the generated pronunciation hints on a user computing device, as discussed in step 210.

Figure 4:
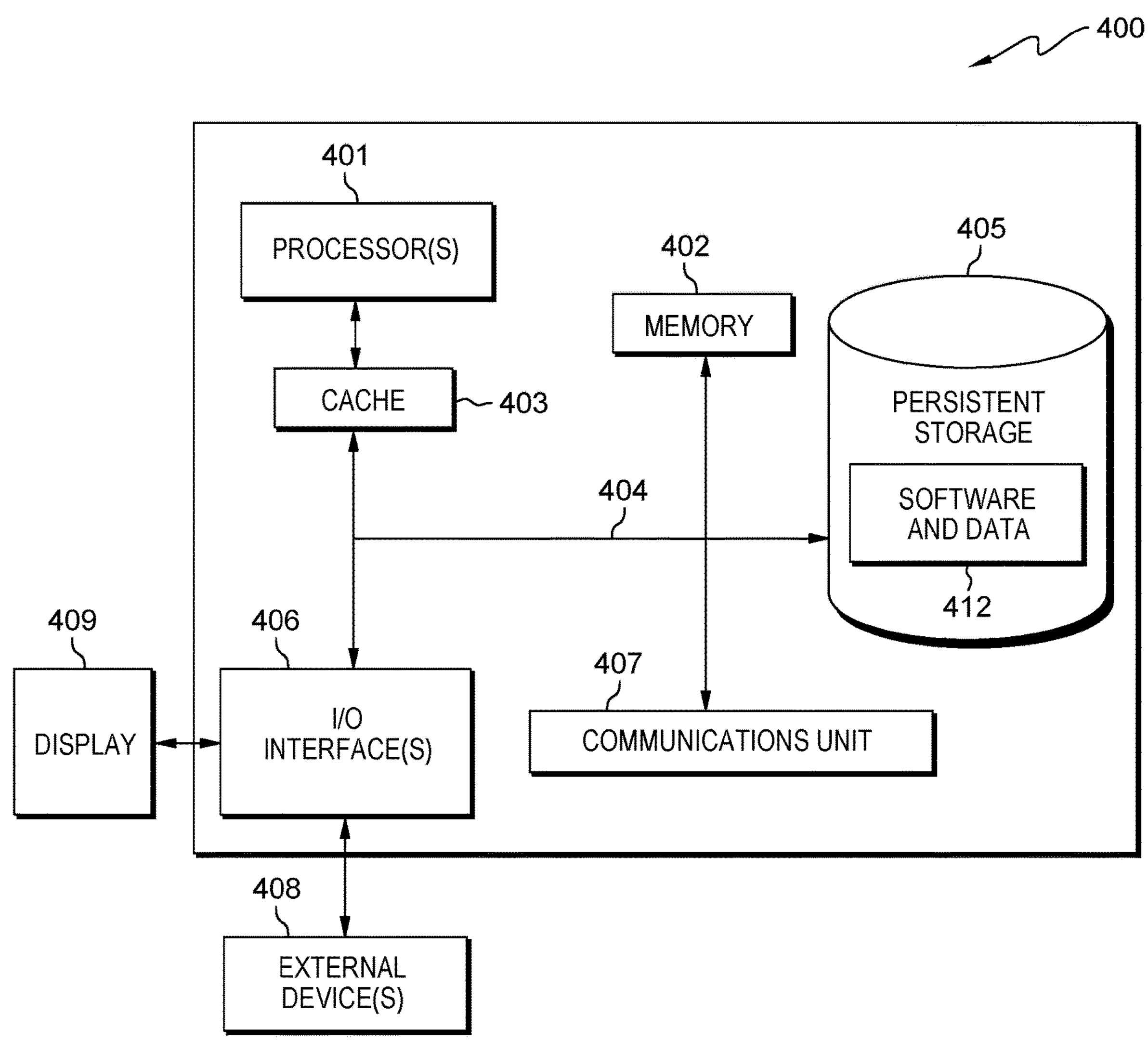
FIG. 4 is a block diagram of components of the server computer executing the pronunciation mapping program, in accordance with an embodiment of the present invention.

FIG. 4 depicts a block diagram 400 of components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

retrieving, by one or more computer processors, one or more phonological rules based on a determined spoken language of a word, a determined different language to display the word, and a calculated linguistic distance based on the determined spoken language and the determined different language to display; and creating, by one or more computer processors, a pronunciation map based on the retrieved phonological rules of the word.

2. The method of claim 1, wherein retrieving one or more phonological rules based on the determined spoken language of the word and the determined language to display the word further comprises:

identifying, by one or more computer processors, one or more idiolectic features of the word;

identifying, by one or more computer processors, one or more isoglossic features of the word;

decomposing, by one or more computer processors, the word into phonemes based on the one or more idiolectic and isoglossic features of the word; and retrieving, by one or more computer processors, additional phonological rules based on the decomposed phonemes.

3. The method of claim 1, wherein creating, a pronunciation map based on the retrieved phonological rules of the word further comprises:

decomposing, by one or more computer processors, the word into segmented phonemes based on the dialect of the spoken word;

identifying, by one or more computer processors, related phonemes in the phonological rules of the language of the display; and mapping, by one or more computer processors, the decomposed phonemes with the identified related phonemes.

4. The method of claim 1, retrieving one or more phonological rules based on the determined spoken language of the word and the determined language to display the word further comprises, retrieving, by one or more computer processors, prosodic rules which include one or more of the following rules: syllable, onset and rime, articulatory gestures, articulatory features, and mora.

5. The method of claim 1 further comprising, generating, by one or more computer processors, one or more pronunciation hints based on the created pronunciation map.

6. The method of claim 5, wherein generating one or more pronunciation hints based on the created pronunciation map further comprises, displaying, by one or more computer processors, the pronunciation hints on a display.

7. The method of claim 5, wherein generating one or more pronunciation hints based on the created pronunciation map further comprises displaying, by one or more computer processors, on an electronic braille display.

8. The method of claim 5, wherein generating pronunciation hints based on the created pronunciation map further comprises, decomposing, by one or more computer processors, the one or more pronunciation hints into phonemes.

9. The method of claim 5, wherein generating pronunciation hints based on the created pronunciation map further comprises:

identifying, by one or more computer processors, one or more images related to the decomposed phonemes;

retrieving, by one or more computer processors, the one or more images related to the decomposed phonemes; and displaying, by one or more computer processors, the decomposed phonemes and the retrieved one or more images.

10. A computer program product comprising:

one or more computer readable storage media and program instructions stored on the one or more computer readable storage media, the program instructions comprising:

program instructions to retrieve one or more phonological rules based on a determined spoken language of a word, a determined different language to display the word, and a calculated linguistic distance based on the determined spoken language and the determined different language to display; and program instructions to create a pronunciation map based on the retrieved phonological rules of the word.

11. The computer program product of claim 10, wherein the program instructions to retrieve one or more phonological rules based on the determined spoken language of the word and the determined language to display the word further comprise program instructions to:

identify one or more idiolectic features of the word;

identify one or more isoglossic features of the word;

decompose the word into phonemes based on the one or more idiolectic and isoglossic features of the word; and retrieve additional phonological rules based on the decomposed phonemes.

12. The computer program product of claim 10, wherein the program instructions to create a pronunciation map based on the retrieved phonological rules of the word further comprise program instructions to:

decompose the word into segmented phonemes based on the dialect of the spoken word;

identify related phonemes in the phonological rules of the language of the display; and map the decomposed phonemes with the identified related phonemes.

13. The computer program product of claim 10, further comprising program instructions, stored on the one or more computer readable storage media, to:

generate one or more pronunciation hints based on the created pronunciation map.

14. The computer program product of claim 13, wherein the program instructions to generate pronunciation hints based on the created pronunciation map further comprise program instructions to:

decompose the one or more pronunciation hints into phonemes.

15. The computer program product of claim 13, wherein the program instructions to generate pronunciation hints based on the created pronunciation map further comprise program instructions to:

identify one or more images related to the decomposed phonemes;

retrieve the one or more images related to the decomposed phonemes; and display the decomposed phonemes and the retrieved one or more images.

16. A computer system comprising:

one or more computer processors;

one or more computer readable storage media; and program instructions stored on the computer readable storage media for execution by at least one of the one or more processors, the program instructions comprising:

program instructions to retrieve one or more phonological rules based on a determined spoken language of a word, a determined different language to display the word, and a calculated linguistic distance based on the determined spoken language and the determined different language to display; and program instructions to create a pronunciation map based on the retrieved phonological rules of the word.

17. The computer system product of claim 16, wherein the program instructions to retrieve one or more phonological rules based on the determined spoken language of the word and the determined language to display the word further comprise program instructions to:

identify one or more idiolectic features of the word;

identify one or more isoglossic features of the word;

decompose the word into phonemes based on the one or more idiolectic and isoglossic features of the word; and retrieve additional phonological rules based on the decomposed phonemes.

18. The computer system product of claim 16, wherein the program instructions to create a pronunciation map based on the retrieved phonological rules of the word further comprise program instructions to:

decompose the word into segmented phonemes based on the dialect of the spoken word;

identify related phonemes in the phonological rules of the language of the display; and map the decomposed phonemes with the identified related phonemes.

19. The computer system product of claim 16, further comprising program instructions, stored on the computer readable storage media for execution by at least one of the one or more processors, to:

generate one or more pronunciation hints based on the created pronunciation map.

20. The computer system product of claim 19, wherein the program instructions to generate pronunciation hints based on the created pronunciation map further comprise program instructions to:

identify one or more images related to the decomposed phonemes;

retrieve the one or more images related to the decomposed phonemes; and display the decomposed phonemes and the retrieved one or more images.

* * * * *